United States Patent
Sawyer et al.

(10) Patent No.: US 11,269,815 B2
(45) Date of Patent: Mar. 8, 2022

(54) WARNING FOR POTENTIAL LOSS OF DATA ON LOGOUT

(71) Applicant: Box, Inc., Redwood City, CA (US)

(72) Inventors: David Sawyer, Campbell, CA (US); Bryn Aspestrand, Burlingame, CA (US); Kevin Wojniak, Dublin, CA (US); Kyle Williams, Redwood City, CA (US); Darryl Trujillo, Redwood City, CA (US)

(73) Assignee: Box, Inc., Redwood City, CA (US)

( * ) Notice: Subject to any disclaimer, the term of this patent is extended or adjusted under 35 U.S.C. 154(b) by 117 days.

(21) Appl. No.: 16/214,574

(22) Filed: Dec. 10, 2018

(65) Prior Publication Data

US 2020/0183888 A1 Jun. 11, 2020

(51) Int. Cl.
*G06F 16/17* (2019.01)
*G06F 16/178* (2019.01)
*G06F 11/14* (2006.01)
*H04L 67/1097* (2022.01)

(52) U.S. Cl.
CPC ........ *G06F 16/178* (2019.01); *G06F 11/1464* (2013.01); *G06F 2201/84* (2013.01); *H04L 67/1097* (2013.01)

(58) Field of Classification Search
CPC .... G06F 16/951; G06F 16/183; G06F 16/168; G06F 16/1734; G06F 16/176; G06F 16/178; G06F 16/122
See application file for complete search history.

(56) References Cited

U.S. PATENT DOCUMENTS

| 2011/0225495 | A1* | 9/2011 | Casalaina | G06Q 30/016 715/716 |
| 2014/0201145 | A1* | 7/2014 | Dorman | G06F 16/27 707/634 |
| 2019/0114330 | A1* | 4/2019 | Xu | G06F 3/0484 |

* cited by examiner

*Primary Examiner* — Apu M Mofiz
*Assistant Examiner* — Cindy Nguyen
(74) *Attorney, Agent, or Firm* — Sheridan Ross P.C.

(57) ABSTRACT

Embodiments of the disclosure provide systems and methods for detecting and providing warnings of potential data loss on termination of a client application of a cloud-based storage system. According to one embodiment, an attempt to log out or otherwise terminate the cloud services client application can be detected and local files at risk of losing data can be identified. A warning can then be presented to the user. For example, a warning can be presented on a display of the client device identifying local files at risk of data loss for various reasons such as those files that are still open by an application, files that are in the process of, but not yet finished, being synchronized, and files that cannot be synchronized. The user can then be given the option to continue or can cancel the termination and attempt to remedy the situation(s) creating the risk of data loss.

18 Claims, 6 Drawing Sheets

WARNING FOR POTENTIAL LOSS OF DATA ON LOGOUT

FIELD OF THE DISCLOSURE

Embodiments of the present disclosure relate generally to methods and systems for preventing data loss between a client device and a cloud-based storage system and more particularly to detecting and providing warnings of potential data loss on termination of a client application of a cloud-based storage system.

BACKGROUND

Cloud-based storage services allow users of client devices to store data remotely, typically in databases maintained by servers of the service, for backup and mass storage purposes. Additionally, these services may provide a collaboration environment allowing multiple users, with proper permissions, to access files stored by the servers. In this way, multiple users, in various locations, can conveniently access and share the same files. In many cases, the files stored on the servers can be replicated locally on the client devices accessing those files. Additionally, new files can be created locally and uploaded to the servers. These files are typically synchronized between the client device and the servers to preserve the latest version of the files. However, instances can arise where data is at risk of being lost. For example, if the client application is closed or the user log out of the service through the client before all local files have been synchronized with the servers, some data may be lost. Hence, there is a need for improved methods and systems for preventing data loss between a client device and a cloud-based storage system.

BRIEF SUMMARY

Embodiments of the disclosure provide systems and methods for detecting and providing warnings of potential data loss on termination of a client application of a cloud-based storage system. According to one embodiment, a method for preventing data loss between a client device and a cloud-based storage system can comprise detecting, by a kernel driver executing at an operating system level on the client device, a request to terminate a cloud services client application executing on the client device, wherein the cloud services client application synchronizes a set of local files with a set of files stored on the cloud-based storage system. One or more files of the set of local files at risk of data loss upon terminating execution of the cloud services client application on the client device can be identified by the kernel driver. The kernel driver can request, from an operating system of the client device, an indication of an application associated with each of the identified one or more files at risk of data loss. The application associated with each of the identified one or more files at risk of data loss can be selected from a plurality of different applications executing on the client device and each of the plurality of different applications uses a different file type.

Before terminating execution of the cloud services client application, the kernel driver can present an interface including an indication of each of the identified one or more files at risk of data loss. For example, identifying the one or more files at risk of data loss upon termination of the cloud services client application can comprise reading a list of one or more open files in the operating system of the client device and identifying one or more files in the set of local files and synchronized by the cloud services client application as at risk of data loss based on being in the list of one or more open files. In such cases, the indication of the identified one or more files at risk of data loss included in the presented interface can comprise a prompt indicating the identified one or more files and the application associated with each identified file. In another example, identifying the one or more files at risk of data loss upon termination of the cloud services client application comprises identifying one or more files in the set of local files currently being synchronized with the set of files stored on the cloud-based storage system by the cloud services client application and the indication of each of the identified one or more files at risk of data loss included in the presented interface comprises a prompt indicating a number of files in the identified one or more files currently being synchronized. In yet another example, identifying the one or more files at risk of data loss upon termination of the cloud services client application comprises identifying one or more files in the set of local files for which synchronization with the set of files stored on the cloud-based storage system cannot be completed by the cloud service client application and the indication of each of the identified one or more files at risk of data loss included in the presented interface can comprise a prompt indicating a number of files in the identified one or more files for which synchronization cannot be completed.

According to another embodiment, a system can comprise a processor and a memory coupled with and readable by the processor. The memory can store therein a set of instructions which, when executed by the processor, can cause the processor to prevent data loss between a client device and a cloud-based storage system by executing a kernel driver at an operating system level of the client device and detecting, by the kernel driver, a request to terminate a cloud services client application executing on the client device, wherein the cloud services client application synchronizes a set of local files with a set of files stored on the cloud-based storage system. One or more files of the set of local files at risk of data loss upon terminating execution of the cloud services client application on the client device can be identified by the kernel driver. The kernel driver can request, from an operating system of the client device, an indication of an application associated with each of the identified one or more files at risk of data loss. The application associated with each of the identified one or more files at risk of data loss can be selected from a plurality of different applications executing on the client device and each of the plurality of different applications uses a different file type.

The client device executing the kernel driver can present an interface including an indication of each of the identified one or more files at risk of data loss before terminating execution of the cloud services client application. For example, identifying the one or more files at risk of data loss upon termination of the cloud services client application can comprise reading a list of one or more open files in the operating system of the client device and identifying one or more files in the set of local files and synchronized by the cloud services client application as at risk of data loss based on being in the list of one or more open files. In such cases, the indication of the identified one or more files at risk of data loss included in the presented interface can comprise a prompt indicating the identified one or more files and the application associated with each identified file. In another example, identifying the one or more files at risk of data loss upon termination of the cloud services client application can comprise identifying one or more files in the set of local files currently being synchronized with the set of files stored on the cloud-based storage system by the cloud services client application and the indication of each of the identified one or more files at risk of data loss included in the presented interface can comprise a prompt indicating a number of files in the identified one or more files currently being synchronized. In yet another example, identifying the one or more files at risk of data loss upon termination of the cloud services client application can comprise identifying one or more files in the set of local files for which synchronization with the set of files stored on the cloud-based storage system cannot be completed by the cloud service client application and the indication of each of the identified one or more files at risk of data loss included in the presented interface can comprise a prompt indicating a number of files in the identified one or more files for which synchronization cannot be completed.

According to yet another embodiment, a non-transitory, computer-readable medium comprising a set of instructions stored therein which, when executed by a processor, causes the processor to prevent data loss between a client device and a cloud-based storage system by executing a kernel driver at an operating system level of the system and detecting, by the kernel driver, a request to terminate a cloud services client application executing on the client device, wherein the cloud services client application synchronizes a set of local files with a set of files stored on the cloud-based storage system. One or more files of the set of local files at risk of data loss upon terminating execution of the cloud services client application on the client device can be identified by the kernel driver. The kernel driver can request, from an operating system of the client device, an indication of an application associated with each of the identified one or more files at risk of data loss. The application associated with each of the identified one or more files at risk of data loss can be selected from a plurality of different applications executing on the client device and each of the plurality of different applications uses a different file type.

The instructions can further cause the processor to present an interface including an indication of each of the identified one or more files at risk of data loss before terminating execution of the cloud services client application. For example, identifying the one or more files at risk of data loss upon termination of the cloud services client application can comprise reading a list of one or more open files in the operating system of the client device and identifying one or more files in the set of local files and synchronized by the cloud services client application as at risk of data loss based on being in the list of one or more open files. In such cases, the indication of each of the identified one or more files at risk of data loss included in the presented interface can comprise a prompt indicating the identified one or more files and the application associated with each identified file. In another example, identifying the one or more files at risk of data loss upon termination of the cloud services client application can comprise identifying one or more files in the set of local files currently being synchronized with the set of files stored on the cloud-based storage system by the cloud services client application and the indication of the identified one or more files at risk of data loss included in the presented interface can comprise a prompt indicating a number of files in the identified one or more files currently being synchronized. In yet another example, identifying the one or more files at risk of data loss upon termination of the cloud services client application can comprise identifying one or more files in the set of local files for which synchronization with the set of files stored on the cloud-based storage system cannot be completed by the cloud service client application and the indication of each of the identified one or more files at risk of data loss included in the presented interface can comprise a prompt indicating a number of files in the identified one or more files for which synchronization cannot be completed.

Figure 1:
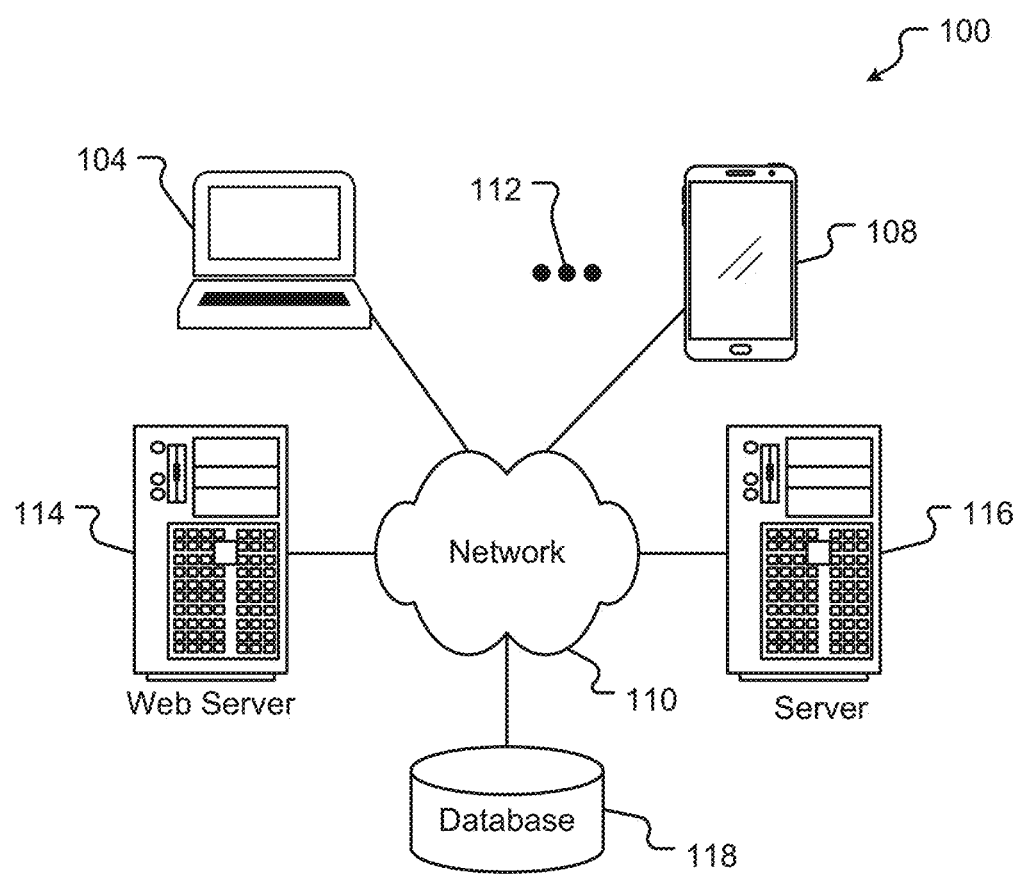
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
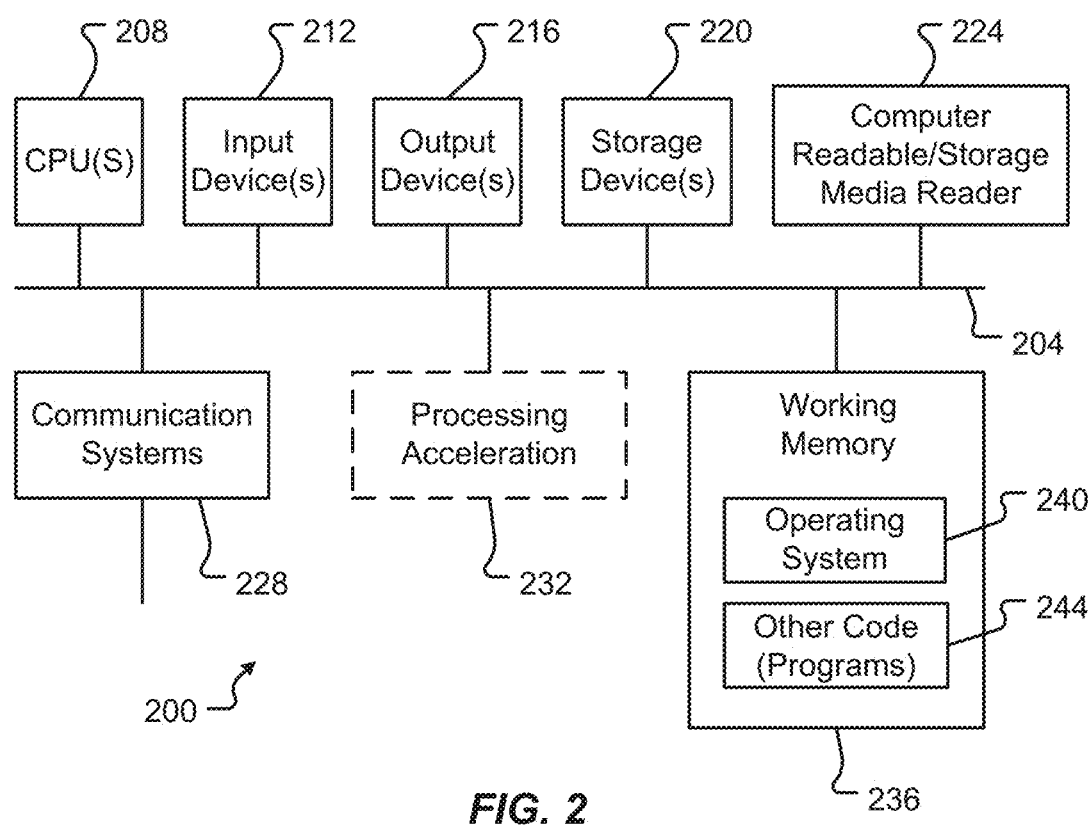
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
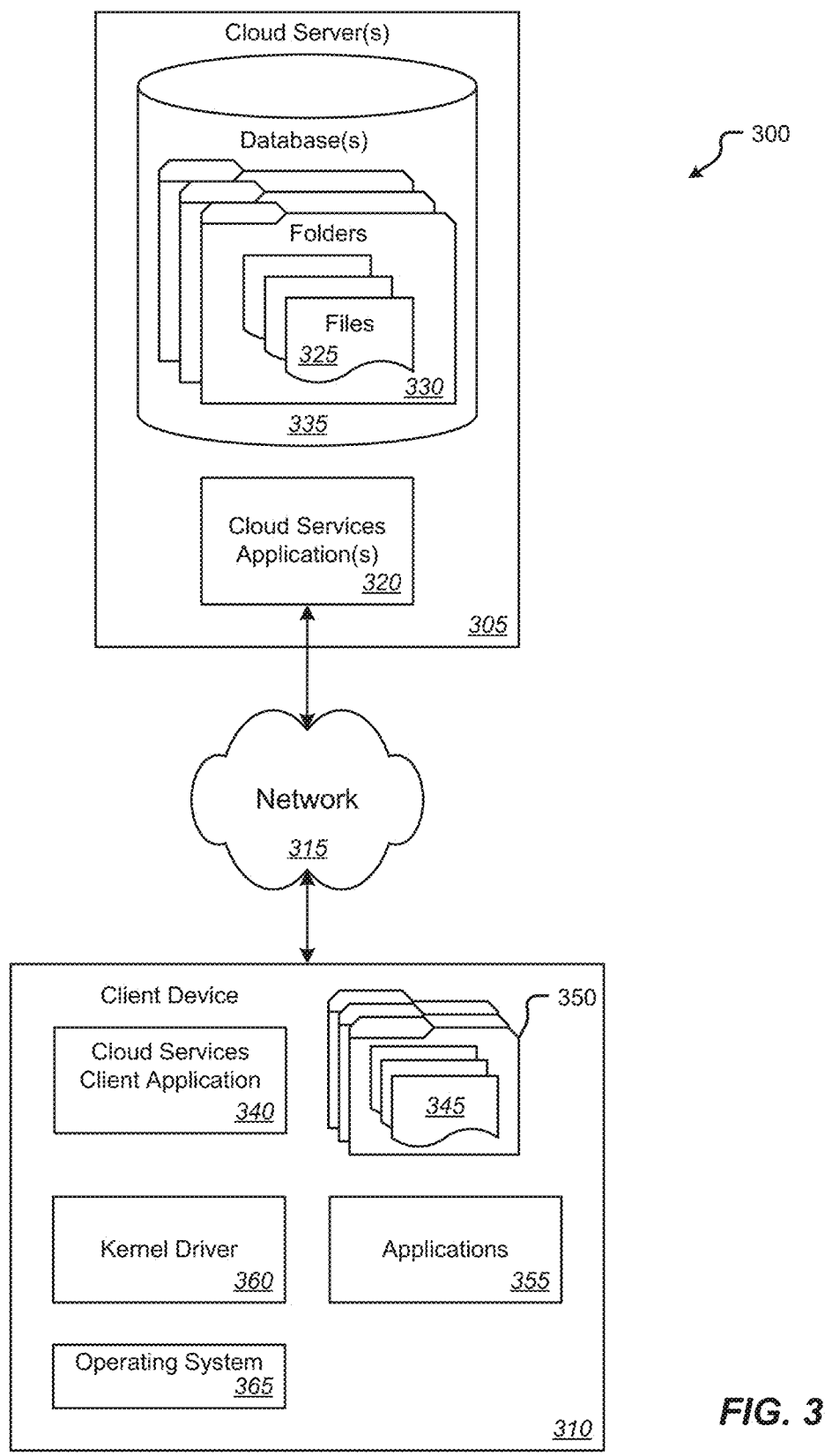
FIG. 3 is a block diagram illustrating elements of an exemplary system for detecting and providing warnings of potential data loss on a client of a cloud-based storage system according to one embodiment of the present disclosure.

FIG. 3 is a block diagram illustrating elements of an exemplary system for detecting and providing warnings of potential data loss on logout of a client of a cloud-based storage system according to one embodiment of the present disclosure. As illustrated in this example, the system 300 can include one or more cloud-based servers 305 such as any of the servers described above and a client device 310 such as any of the computers or other devices described above. The client device 310 can be communicatively coupled with the server(s) 305 via a communications network 315 such as any one or more wired and/or wireless LANs and/or WANs, the Internet, and/or other networks as described above.

Generally speaking, the server(s) 305 can execute a set of cloud services application(s) 320. The cloud services application(s) 320 can maintain and provide access to a set of files 325, perhaps organized into a set of folders 330, and stored in a database 335 or other repository. For example, the cloud services application(s) can provide for remote, cloud-based backup and storage of the files 325 and folders 330. In some cases, the cloud services application(s) 320 can provide a collaboration environment. Generally speaking, a collaboration environment can comprise a cloud-based virtual workspace in which the files 325 and folders 330 can be shared as work items among a group of users.

The client device 310 can execute a cloud services client application 340 for accessing and interacting with the cloud services application(s) 320 of the server(s) 305. For example, the cloud services client application 340 can provide access to the workspace of the collaboration environment provided by the cloud services application(s) 320 and provide the user of the client device 310 the ability to read, edit, copy, or otherwise manipulate the files 325 and folders 330 as permissions and collaboration environment access controls implemented by the cloud services application(s) 320 allow.

The client device 310 can also have stored thereon a set of local files 345, perhaps organized into one or more folders 350. These files 345 and folders 350 can be created and/or accessed by a set of applications 355 executing on the client device 310. Additionally, or alternatively, these files 345 and folders 350 can be created and/or accessed by the cloud services client application 340. According to one embodiment, the files 345 and folders 350 on the client device 310 can comprise local copies of the files 325 and folders 330 on the server(s) 305. In such cases, the cloud services client application 340 can perform synchronization between the local files 345 and folders 350 and the files 325 and folders 330 on the server(s) 305.

Typically, this synchronization is performed periodically or on the occurrence of some event. For example, in the case of the cloud services application 320 providing cloud back and storage services, the local files 345 and folders 350 may be synchronized with the files 325 and folders 330 on the server after a certain period of time, at a certain time of day, etc. In another example, such as when the cloud service application 320 is providing a collaborative environment, a local file 345 may be created when a file 325 on the server 305 is accessed through the cloud services client application 340 and opened by an application 355 executing on the client device 310. Then, when the application 355 saves or closes that local file 345, the cloud services client application 340 can synchronize the local file 345 with the remote file 325 on the server 305. Similarly, a local file 345 created by one of the applications 355 of the client device 310 can be saved to and synchronized with a remote file 325 on the server 305.

However, possibilities for loss of data can occur. For example, if the user attempts to log out of the cloud services application 320 through the cloud services client application 340 or close the cloud services client application 340 and not all local files 345 have been saved to or synchronized with files 325 on the server, some data may be lost. This possibility arises for a few different reasons. One problem is that any local files 345 that are still open within any of the applications 355 on the client device may have changes not yet saved to the local file 345 and thus are not yet synchronized with the files 325 on the server 305. Another problem arises when the cloud service client application 340 is in the process of synchronizing the local files 345 and folders 350 with the server 305 but has not yet finished. Those local files 345 and folders 350 inflight or not yet synchronized can be lost. Yet another problem arises when local files 345 and folders 350 cannot be synchronized with the server 305 do to errors such as naming convention conflicts etc. Such files are also possibly lost on log out or termination of the cloud services client application 340

According to one embodiment, the client device 310 can further include a kernel driver 360. This kernel driver 360 can execute on the client device 310 at an operating system 365 level and therefore has access to operating system level interrupts and functions. Thus, the kernel driver 360 can detect an attempt to log out or otherwise terminate the cloud services client application 340. Before this happens, and as will be described in greater detail below, the kernel driver 360 can pause the log out or termination of the cloud services client application 340, identify those local files 345 and folders 350 at risk of losing data, and present a warning to the user of the client device 310. For example, the kernel driver 360 can present, or cause the cloud services client application 340 to present, on a display of the client device 310 a warning message identifying local files 345 at risk of data loss for any of the reasons listed above, i.e., files 345 that are still open by an application 355, files that are in the process of, but not yet finished, being synchronized, and files that cannot be synchronized. The user can then be given the option to continue with logging out or terminating the cloud services client application 340 knowing that data a loss can occur, or can cancel the log out or termination and attempt to remedy the situation(s) creating the risk of data loss.

Figure 4:
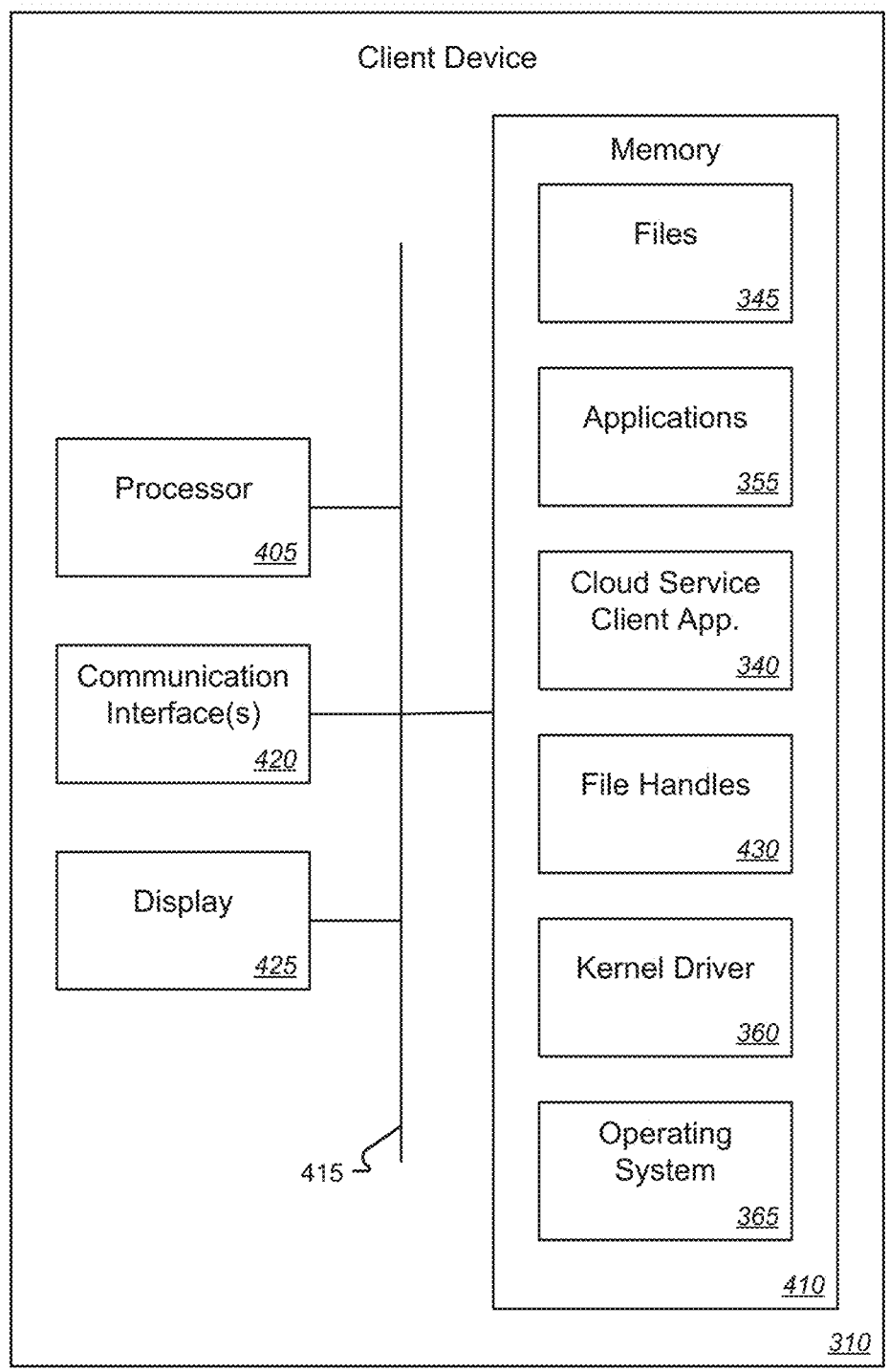
FIG. 4 is a block diagram illustrating additional details of an exemplary client device in which embodiments of the present disclosure may be implemented.

FIG. 4 is a block diagram illustrating additional details of an exemplary client device in which embodiments of the present disclosure may be implemented. As illustrated in this example, a client device 310 can comprise a processor 405 such as any of the various types of processors described above. A memory 410 can be coupled with and readable by the processor 405 via a communications bus 415. The memory 410 can comprises any one or more of the different types of volatile and/or non-volatile memories described above. The processor 405 can also be coupled with one or more communication interfaces 420 and a display 425 via the communications bus 415. The communication interfaces 420 can comprise any of a variety of wired or wireless communications interfaces for connecting the client device 310 to a communications network as described above and as known in the art. The display 425 can comprise, for example, a Liquid Crystal Display (LCD), Light Emitting Diode (LED) display, Organic Light Emitting Diode (OLED) display, Plasma Display Panel (PDP), or any similar display as known in the art.

The memory 410 can store therein sets of instructions which, when executed by the processor 405, cause the processor 405 to detect and provide warnings of potential data loss on logout or termination of a client of a cloud-based storage system as described herein. More specifically, the memory can store a set of cloud service client application instructions 340 which, when executed by the processor 405, cause the processor 405 to access and interact with the cloud services application(s) 320 of the server(s) 305, through the communication interface 420, as described above. For example, the cloud services client application instructions 340 can provide access to the workspace of the collaboration environment provided by the cloud services application(s) 320 and provide the user of the client device 310 the ability to read, edit, copy, or otherwise manipulate the files 325 and folders 330 as permissions and collaboration environment access controls implemented by the cloud services application(s) 320 allow. The memory 410 of the client device 310 can also have stored thereon a set of local files 345. These files 345 can be created and/or accessed by a set of application instructions 355 also stored in the memory 410 and executed by the processor 405. As described above, the cloud services client application instructions 340 can perform, through the communication interface 420 synchronization between the local files 345 and the files 325 and folders 330 on the server(s) 305.

The memory 410 can also include a set of kernel driver instructions 360 and a set of operating system instructions 365. Generally speaking, the operating system instructions 365 can provide the basic instructions for performing the basic functions of the client device, such as reading from and writing to memory 410 and input/output devices, managing memory 410 and execution of application instructions 355 by the processor 405, and other functions as known in the art. The kernel driver instructions 360 can be executed by the processor 405 at an operating system level, i.e., at a same level as the operating system instructions 365. It should be understood that most operating systems such as may be executed by the client device 310 operate more than one level since the lowest levels, e.g., level 0, present some security and stability risks. Therefore, the kernel driver instructions 360 and the functions performed thereby can operate at more than one level of the operating system. For example, the kernel driver instructions 360 can detect an attempt to log out or otherwise terminate the cloud services client application instructions 340. Before this happens, the kernel driver instructions 360 can pause the log out or termination of the cloud services client application instructions 340. These functions may be performed at a relatively low level, and in some cases even level 0, of the operating system. Additional functions of the kernel driver instructions 360 may operate at higher levels of the operating system.

For example, and as introduced above, the kernel driver instructions 360 can further cause the processor 405 to identify local files 345 at risk of losing data, and present, through the display 425, a warning to the user of the client device 310. For example, the kernel driver instructions 360 can present, on the display 425, a warning message identifying local files 345 at risk of data loss for any of the reasons listed above, i.e., files 345 that are still open by an application instructions 355, files that are in the process of, but not yet finished, being synchronized, and files that cannot be synchronized. The user can then be given the option to continue with logging out or terminating the cloud services client application 340 knowing that data a loss can occur, or can cancel the log out or termination and attempt to remedy the situation(s) creating the risk of data loss.

Stated another way, the kernel driver instructions 360 can cause the processor 405 to detect a request to terminate the cloud services client application instructions 340. Detecting the request to terminate the cloud services client application instructions 340 can comprise detecting a request to logout from the cloud-based storage system or detecting a request to close the cloud services client application. Before terminating the cloud services client application, the kernel driver instructions 360 can cause the processor 405 to identify one or more local files 345 at risk of data loss. Identifying the one or more files at risk of data loss upon termination of the cloud services client application can comprise identifying open files 345 on the client device 310. This can be done, for example, by reading a list of file handles 430 maintained by the operating system instructions 365 which identifies open files in the operating system of the client device 310. Using this list, the kernel driver instructions 360 can cause the processor 405 to identify local files 345 as at risk of data loss based on those files being in the list of file handles 430. Additionally, or alternatively, the kernel driver instructions 360 can cause the processor 405 to identify files 345 currently being synchronized with the set of files stored on the cloud-based storage system by the cloud services client application and/or files 345 or which synchronization with the cloud-based storage system cannot be completed. This can be based, for example, on a file naming or other conflict, errors in the synchronization process, or other reasons.

Once the files at risk of data loss have been identified, the kernel driver instructions 360 can cause the processor 405 to request, from the operating system instructions 365, an indication of application instructions 355 associated with each of the identified open file and/or other files at risk of data loss. In some cases, the applications associated with the other identified files, i.e., those that are in process and those that cannot be synchronized, can also be identified, e.g., based on a pre-defined association between the file type for the file 345 and an application maintained by the operating system instructions 365. The kernel driver instructions can then, before termination the cloud services client application instructions 340, cause the processor 405 to present, through the display 425, an interface including an indication of each of the identified one or more files 345 at risk of data loss. For example, a prompt indicating the identified open files and the application associated with each, a number of files currently being synchronized, a number of files for which synchronization cannot be completed, and other possible indications. An example of such a user interface will be described below.

Figure 5:
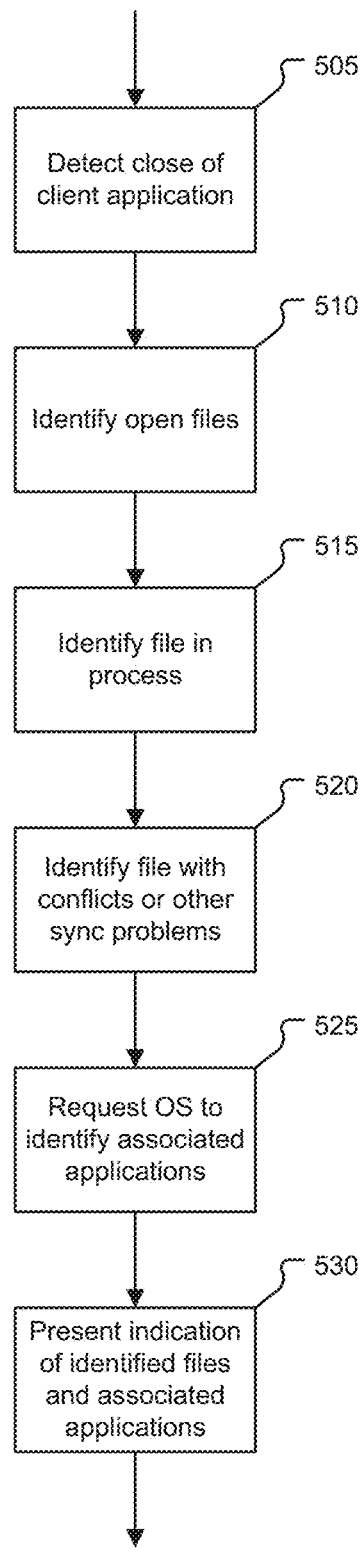
FIG. 5 is a flowchart illustrating an exemplary process for detecting and providing warnings of potential data loss on a client of a cloud-based storage system according to one embodiment of the present disclosure.

FIG. 5 is a flowchart illustrating an exemplary process for detecting and providing warnings of potential data loss on logout of a client of a cloud-based storage system according to one embodiment of the present disclosure. As illustrated in this example, the process can begin with detecting 505, by a kernel driver executing at an operating system level on the client device, a request to terminate a cloud services client application executing on the client device. As described above, the cloud services client application can synchronize a set of local files stored on the client device with a set of files stored on the cloud-based storage system. Detecting 505 the request to termination the cloud services client application can comprise detecting a request to logout from the cloud-based storage system or detecting a request to close the cloud services client application.

Before terminating the cloud services client application, the kernel driver can identify one or more files of the set of local files at risk of data loss upon terminating execution of the cloud services client application on the client device. Identifying the one or more files at risk of data loss upon termination of the cloud services client application can comprise identifying 510 open files on the client device. This can be done, for example, by reading a list of one or more open files in the operating system of the client device and identifying 510 one or more files in the set of local files stored on the client device and synchronized by the cloud services client application as at risk of data loss based on those files being in the list of one or more open files.

Additionally, or alternatively, identifying the one or more files at risk of data loss upon termination of the cloud services client application can comprise identifying 515 one or more files in the set of local files stored on the client device currently being synchronized with the set of files stored on the cloud-based storage system by the cloud services client application. Identifying the one or more files at risk of data loss upon termination of the cloud services client application can additionally, or alternatively, comprise identifying 520 one or more files in the set of local files stored on the client device for which synchronization with the set of files stored on the cloud-based storage system cannot be completed by the cloud service client application. This can be based, for example, on a file naming or other conflict, errors in the synchronization process, or other reasons.

Once the files at risk of data loss have been identified, the kernel driver can request 525, from an operating system of the client device, an indication of an application associated with each of the identified open file and/or other files at risk of data loss. The application associated with each of the identified one or more files at risk of data loss can be any of a variety of different applications executing on the client device and each of the different applications can use a different file type. For example, the files can include document files opened in a word processor application, worksheet files opened in a spreadsheet program, image or graphic files opened in an image or graphics editor or viewer, etc. In some cases, the applications associated with the other identified files, i.e., those that are in process and those that cannot be synchronized, can also be identified, e.g., based on a pre-defined association between the file type for the file and an application.

The kernel driver can then, before terminating execution of the cloud services client application, present 530 an interface including an indication of each of the identified one or more files at risk of data loss. For example, a prompt indicating the identified open files and the application associated with each, a number of files currently being synchronized, a number of files for which synchronization cannot be completed, and other possible indications. An example of such a user interface will be described below.

Figure 6:
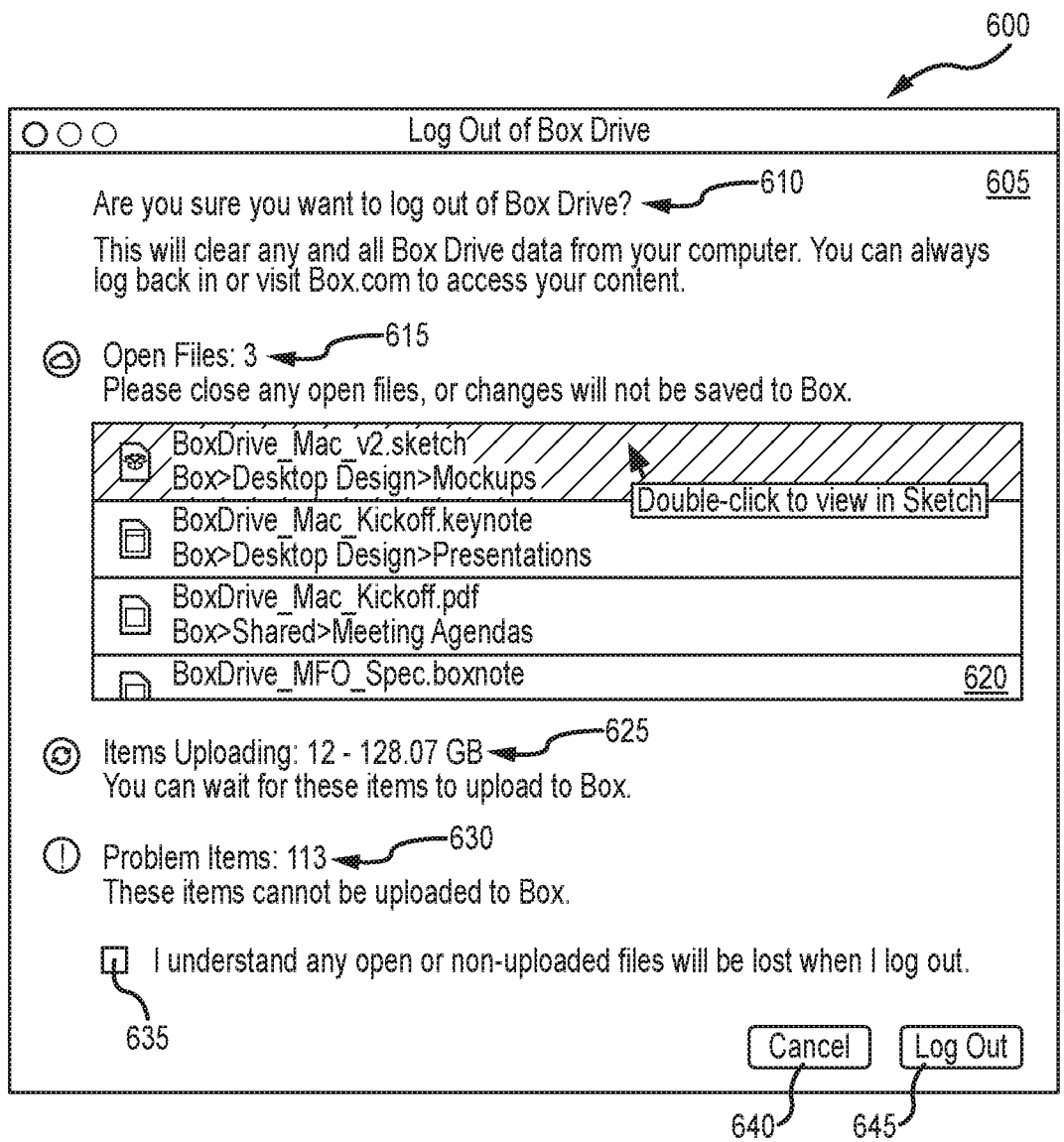
FIG. 6 illustrates an exemplary user interface for providing warnings of potential data loss on a client of a cloud-based storage system according to one embodiment of the present disclosure.

FIG. 6 illustrates an exemplary user interface for providing warnings of potential data loss on logout of a client of a cloud-based storage system according to one embodiment of the present disclosure. As illustrated in this example, the interface 600 can comprise a dialog box 605 or similar element which can be presented when the kernel driver detects a request to terminate the cloud services client application, e.g., when the user selects a button or icon to log out, tries to close the application, or otherwise attempts to leave or stop execution of the client application. This dialog box 605 can present a warning 610 indicating that data loss is possible. Additionally, indications of the files at risk of data loss can be presented.

For example, the indications of the files at risk of data loss can include a prompt 615 indicating the identified open files and the application associated with each identified file. This indication can also include a list 620 of all open files. Through this list 620, the indicated file can be selected, e.g., by manipulation of a mouse, touch screen, or other cursor control, and closed to save the file. As illustrated here, the dialog box 605 can also include a prompt 625 indicating a number of files in the identified one or more files currently being synchronized and a prompt 630 indicating a number of files in the identified one or more files for which synchronization cannot be completed.

As also illustrated here, the dialog box 605 can include additional elements such as a checkbox or similar element with a textual warning about the potential data loss and indicating that, by checking the checkbox, the user accepts or intends this data loss, i.e., the user does not want to save the files indicated in the prompts 615, 625, and 630. The dialog box 605 can also include a "Cancel" button 640 or similar element that can be selected to cancel the log out or termination of the cloud services client application, e.g., if the user decides to wait for the in-process synchronization to complete, wants to try to resolve the indicated conflicts or other problems, etc. The dialog box 605 can also include a "Log Out" button 645 or similar element that can be selected to complete the termination of or log out from the cloud services client application. In some cases, the button 645 may be greyed out or not selectable unless or until the user also selects the checkbox 635 indicating acceptance of the potential data losses indicated in the dialog box 605.

It should be understood that the interface 600 presented in FIG. 6 and described herein is offered by way of example for illustrative purposes only and should not be considered to limit the scope of the disclosure. Rather, depending upon the implementation, the interface 600 can vary considerably without departing from the scope of the present disclosure. For example, the format and content of the interface 600 can contain fewer elements, more elements, different elements, different formats, etc. Any such variations in content or form are considered to be within the scope of the present disclosure.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for preventing data loss between a client device and a cloud-based storage system, the method comprising:
    detecting, by a kernel driver executing at an operating system level on the client device, an operating system level event occurring on the client device, wherein the operating system level event causes termination of a cloud services client application executing on the client device, and wherein the cloud services client application synchronizes a set of local files with a set of files stored on the cloud-based storage system;
    identifying, by the kernel driver, one or more files of the set of local files at risk of data loss upon termination of the cloud services client application on the client device;
    requesting, by the kernel driver, from an operating system of the client device, an indication of an application associated with each of the identified one or more files at risk of data loss, wherein the application associated with each of the identified one or more files at risk of data loss is selected from a plurality of different applications executing on the client device and wherein each of the plurality of different applications uses a different file type; and
    presenting, by the kernel driver, before termination of the cloud services client application, an interface including an indication of each of the identified one or more files at risk of data loss, wherein the indication of the identified one or more files at risk of data loss included in the presented interface comprises a prompt indicating the identified one or more files and the application associated with each identified file.

2. The method of claim 1, wherein identifying the one or more files at risk of data loss upon termination of the cloud services client application comprises reading a list of one or more open files in the operating system of the client device and identifying one or more files in the set of local files and synchronized by the cloud services client application as at risk of data loss based on being in the list of one or more open files.

3. The method of claim 1, identifying the one or more files at risk of data loss upon termination of the cloud services client application comprises identifying one or more files in the set of local files currently being synchronized with the set of files stored on the cloud-based storage system by the cloud services client application.

4. The method of claim 3, wherein the indication of each of the identified one or more files at risk of data loss included in the presented interface comprises a prompt indicating a number of files in the identified one or more files currently being synchronized.

5. The method of claim 1, wherein identifying the one or more files at risk of data loss upon termination of the cloud services client application comprises identifying one or more files in the set of local files for which synchronization with the set of files stored on the cloud-based storage system cannot be completed by the cloud service client application.

6. The method of claim 5, wherein the indication of each of the identified one or more files at risk of data loss included in the presented interface comprises a prompt indicating a number of files in the identified one or more files for which synchronization cannot be completed.

7. A client device comprising:
    a processor; and
    a memory coupled with and readable by the processor and storing therein a set of instructions which, when executed by the processor, causes the processor to prevent data loss between the client device and a cloud-based storage system by:
    executing a kernel driver at an operating system level of the client device;
    detecting, by the kernel driver, an operating system level event occurring on the client device, wherein the operating system level event causes termination of a cloud services client application executing on the client device, and wherein the cloud services client application synchronizes a set of local files with a set of files stored on the cloud-based storage system;
    identifying, by the kernel driver, one or more files of the set of local files at risk of data loss upon termination of the cloud services client application on the client device;
    requesting, by the kernel driver, from an operating system of the client device, an indication of an application associated with each of the identified one or more files at risk of data loss, wherein the application associated with each of the identified one or more files at risk of data loss is selected from a plurality of different applications executing on the client device and wherein each of the plurality of different applications uses a different file type; and
    presenting, by the kernel driver, before termination of the cloud services client application, an interface including an indication of each of the identified one or more files at risk of data loss, wherein the indication of the identified one or more files at risk of data loss included in the presented interface comprises a prompt indicating the identified one or more files and the application associated with each identified file.

8. The client device of claim 7, wherein identifying the one or more files at risk of data loss upon termination of the cloud services client application comprises reading a list of one or more open files in the operating system of the client device and identifying one or more files in the set of local files and synchronized by the cloud services client application as at risk of data loss based on being in the list of one or more open files.

9. The client device of claim 7, identifying the one or more files at risk of data loss upon termination of the cloud services client application comprises identifying one or more files in the set of local files currently being synchronized with the set of files stored on the cloud-based storage system by the cloud services client application.

10. The client device of claim 9, wherein the indication of each of the identified one or more files at risk of data loss included in the presented interface comprises a prompt indicating a number of files in the identified one or more files currently being synchronized.

11. The client device of claim 7, wherein identifying the one or more files at risk of data loss upon termination of the cloud services client application comprises identifying one or more files in the set of local files for which synchronization with the set of files stored on the cloud-based storage system cannot be completed by the cloud service client application.

12. The client device of claim 11, wherein the indication of each of the identified one or more files at risk of data loss included in the presented interface comprises a prompt indicating a number of files in the identified one or more files for which synchronization cannot be completed.

13. A non-transitory, computer-readable medium comprising a set of instructions stored therein which, when executed by a processor, causes the processor to prevent data loss between a client device and a cloud-based storage system by:
    executing a kernel driver at an operating system level of the client device;
    detecting, by the kernel driver, an operating system level event occurring on the client device, wherein the operating system level event causes termination of a cloud services client application executing on the client device, wherein the cloud services client application synchronizes a set of local files with a set of files stored on the cloud-based storage system;
    identifying, by the kernel driver, one or more files of the set of local files at risk of data loss upon termination of the cloud services client application on the client device;
    requesting, by the kernel driver, from an operating system of the client device, an indication of an application associated with each of the identified one or more files at risk of data loss, wherein the application associated with each of the identified one or more files at risk of data loss is selected from a plurality of different applications executing on the client device and wherein each of the plurality of different applications uses a different file type; and
    presenting, by the kernel driver, before termination of the cloud services client application, an interface including an indication of each of the identified one or more files at risk of data loss, wherein the indication of the identified one or more files at risk of data loss included in the presented interface comprises a prompt indicating the identified one or more files and the application associated with each identified file.

14. The non-transitory, computer-readable medium of claim 13, wherein identifying the one or more files at risk of data loss upon termination of the cloud services client application comprises reading a list of one or more open files in the operating system of the client device and identifying one or more files in the set of local files and synchronized by the cloud services client application as at risk of data loss based on being in the list of one or more open files.

15. The non-transitory, computer-readable medium of claim 13, identifying the one or more files at risk of data loss upon termination of the cloud services client application comprises identifying one or more files in the set of local files currently being synchronized with the set of files stored on the cloud-based storage system by the cloud services client application.

16. The non-transitory, computer-readable medium of claim 15, wherein the indication of each of the identified one or more files at risk of data loss included in the presented interface comprises a prompt indicating a number of files in the identified one or more files currently being synchronized.

17. The non-transitory, computer-readable medium of claim 13, wherein identifying the one or more files at risk of data loss upon termination of the cloud services client application comprises identifying one or more files in the set of local files for which synchronization with the set of files stored on the cloud-based storage system cannot be completed by the cloud service client application.

18. The non-transitory, computer-readable medium of claim 17, wherein the indication of each of the identified one or more files at risk of data loss included in the presented interface comprises a prompt indicating a number of files in the identified one or more files for which synchronization cannot be completed.

* * * * *